United States Patent

Uno et al.

(10) Patent No.: US 11,888,341 B2
(45) Date of Patent: Jan. 30, 2024

(54) CONTROL APPARATUS, POWER SYSTEM, AND CONTROL METHOD

(71) Applicant: KABUSHIKI KAISHA TOSHIBA, Tokyo (JP)

(72) Inventors: Hiroshi Uno, Kawasaki Kanagawa (JP); Qiang Lin, Kawasaki Kanagawa (JP); Tetsu Shijo, Setagaya Tokyo (JP); Yasuhiro Kanekiyo, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/690,697

(22) Filed: Mar. 9, 2022

(65) Prior Publication Data

US 2022/0360099 A1   Nov. 10, 2022

(30) Foreign Application Priority Data

May 10, 2021   (JP) ................................. 2021-079841

(51) Int. Cl.
*H02J 3/32* (2006.01)
*H02J 7/00* (2006.01)

(52) U.S. Cl.
CPC ............ *H02J 7/00712* (2020.01); *H02J 3/32* (2013.01); *H02J 7/00032* (2020.01); *H02J 7/0048* (2020.01)

(58) Field of Classification Search
CPC ...... H02J 7/00712; H02J 3/32; H02J 7/00032; H02J 7/0048; H02J 13/00002

USPC .......................................................... 307/19
See application file for complete search history.

(56) References Cited

U.S. PATENT DOCUMENTS

| 7,800,242 B2 * | 9/2010 | Stiesdal ................... F03D 9/255 290/55 |
| 10,746,043 B2 | 8/2020 | Hiroe et al. |
| 2017/0222437 A1 * | 8/2017 | Pratt ....................... B60L 58/13 |

FOREIGN PATENT DOCUMENTS

JP   6696010 B2   5/2020

* cited by examiner

*Primary Examiner* — Rexford N Barnie
*Assistant Examiner* — Xuan Ly
(74) *Attorney, Agent, or Firm* — Finnegan, Henderson, Farabow, Garrett & Dunner, LLP

(57) ABSTRACT

A control apparatus controlling a power output apparatus that generates, based on input power from one of an electrical grid and a power storage, output power to another of the electrical grid and the power storage is provided. The control apparatus includes: a communicator to receive a grid frequency of the electrical grid and a state of charge of the power storage, or information allowing the grid frequency and the state of charge to be calculated; and a processor to determine an output destination and an output rate of the output power, based on a function of calculating the output destination and the output rate according to the grid frequency. The output destination and the output rate are adjusted according to the state of charge, by the processor changing, according to the state of charge, the function used to determine the output destination and the output rate.

12 Claims, 8 Drawing Sheets

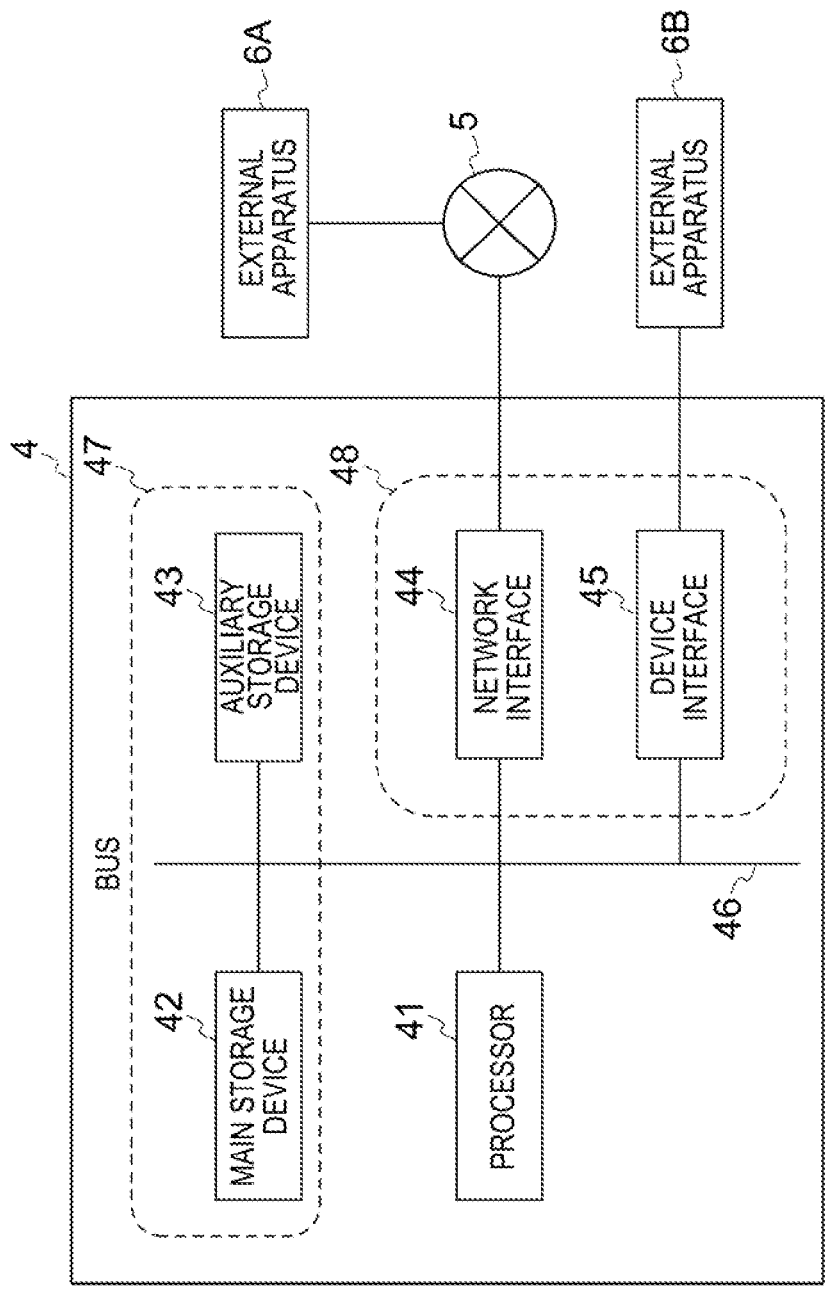

CONTROL APPARATUS, POWER SYSTEM, AND CONTROL METHOD

CROSS REFERENCE TO RELATED APPLICATIONS

This application is based upon and claims the benefit of priority from the prior Japanese Patent Application No. 2021-079841, filed on May 10, 2021, the entire contents of which are incorporated herein by reference.

FIELD

Embodiments of the present invention relate to a control apparatus, a power system, and a control method.

BACKGROUND

Power systems connected to an electrical grid receives instructions from the electrical grid, and adjust input and output of electric power, in order to accommodate variation in electric power demand. For example, governor-free (GF) operation, load frequency control (LFC), economic load dispatching control (EDC) or the like is performed. Such adjustment is required to flexibly accommodate short-term variation in demand.

Unfortunately, not all the power systems can freely exert an adjustment capability. For example, there is a virtual synchronous inverter that is mounted with an algorithm simulating a synchronous generation system, and a storage battery to thereby contribute to power adjustment of power transmission and distribution. Unlike mechanical power systems that can obtain inexhaustible energy when power is supplied, power converters and the like that have an inertial force and an adjustment capability, such as of the virtual synchronous inverter, and simulate an operation of a power system obtaining energy from a storage battery, or an equivalent of the power system can only discharge or absorb energy depending on "SoC" (State of Charge) of a power storage. Accordingly, if the conventional method having been applied to a mechanical power system is applied as it is to such a power system, it is required to charge or discharge electric energy equal to or higher than the limit of the storage battery, and can sometimes cause a failure.

BRIEF DESCRIPTION OF THE DRAWINGS

FIG. 10 is a block diagram showing an example of a hardware configuration according to one embodiment of the present invention.

DETAILED DESCRIPTION

Figure 1:
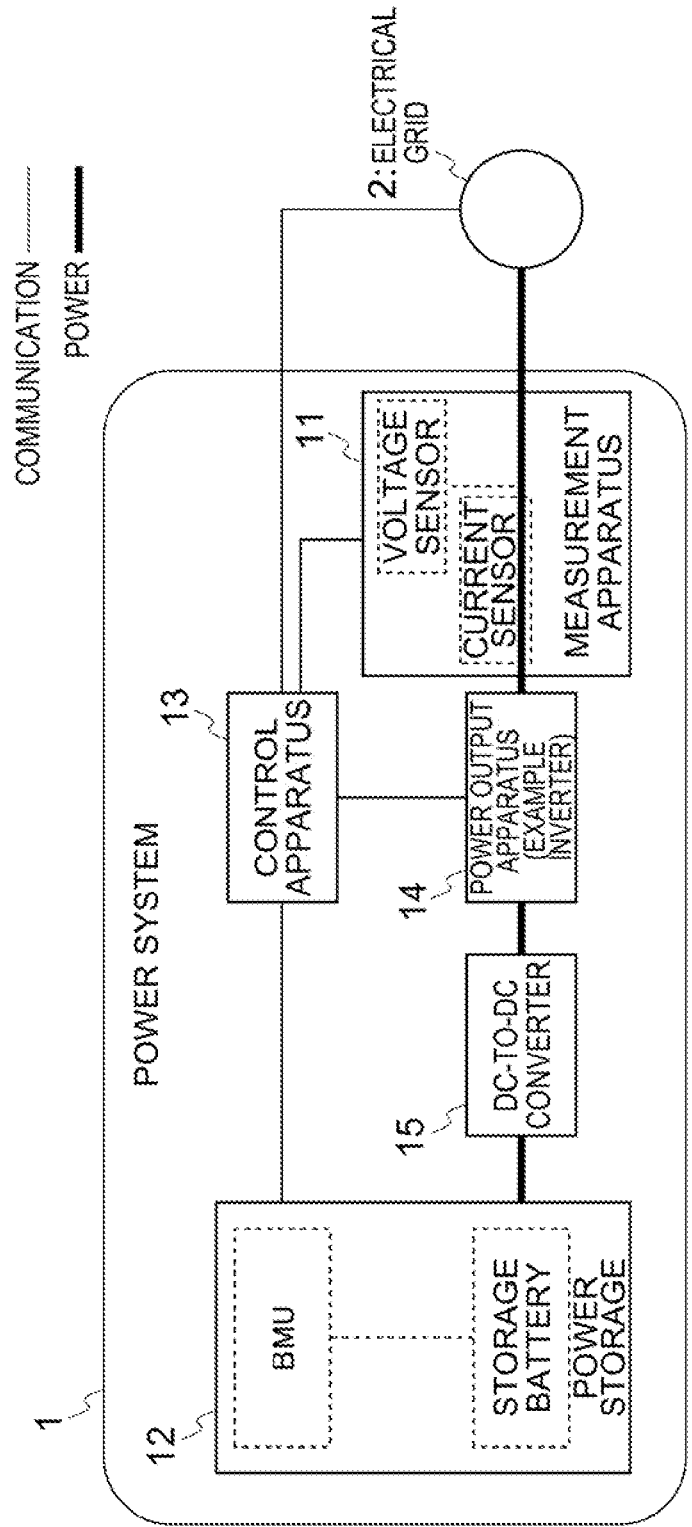
FIG. 1 is a block diagram showing an example of a power system according to one embodiment of the present invention.

According to one embodiment, a control apparatus controlling a power output apparatus that generates, based on input power from one of an electrical grid and a power storage, output power to another of the electrical grid and the power storage. The control apparatus includes: a communicator configured to receive a grid frequency of the electrical grid and a state of charge of the power storage, or information allowing the grid frequency and the state of charge to be calculated; and a processor configured to determine an output destination and an output rate of the output power, from the grid frequency, based on a function of calculating the output destination and the output rate when the grid frequency is input to the function. The output destination and the output rate are adjusted according to the state of charge, by the processor changing, according to the state of charge, the function used to determine the output destination and the output rate.

Hereinafter, referring to the drawings, embodiments of the present invention are described.

One Embodiment of Present Invention

FIG. 1 is a block diagram showing an example of a power system according to one embodiment of the present invention. This embodiment assumes a power system connected to an electrical grid. The power system includes a measurement apparatus 11, a power storage 12, a control apparatus 13, a power output apparatus 14 (for example, an inverter), and a DC-to-DC converter 15. Note that components of the power system that are not related to control assumed by this embodiment are omitted. Accordingly, the components other than those shown in FIG. 1 may be included in the power system. FIG. 1 also shows internal configuration examples of the measurement apparatus 11 and the power storage 12. However, there is no limitation to the internal configuration example.

The power system 1 of this embodiment is a system that can support both the output of power to the electrical grid 2, and the input of power from the electrical grid 2, in order to accommodate variation in demand of the electrical grid 2. In other words, this system is a system that supplies power to the electrical grid 2 at certain timing, and receives power supplied from the electrical grid 2 at other timing.

Note that in the following description, power that the power system 1 outputs to the electrical grid 2, and power input to the power system 1 from the electrical grid 2 are collectively described as input and output power in some cases. In the case of such description, electric energy when power is output from the power system 1 to the electrical grid 2 is represented as a positive value, and electric energy input from the electrical grid 2 to the power system 1 is represented as a negative value. Note that definitions of the positive and the negative may be inverted from each other.

Note that the input and output power is assumed to be represented as active power that is electric energy consumed per unit time, but is not limited to the active power, and may be appropriately defined.

Typically, the power system 1 accepts an instruction about input and output power from the electrical grid 2, and follows the instruction. Accordingly, the control may be performed after receiving a permission notification from the electrical grid 2. Alternatively, in a predetermined time slot or the like, the control may be performed. Typically, not only one but multiple power systems 1 are grid-interconnected. It is only required that the electrical grid 2 recognizes input and output power of each power system 1, and issues an instruction to the corresponding power system 1. Each power system 1 is not necessarily recognize input and output power of power systems other than the power system 1. Accordingly, the other power systems connected to the electrical grid 2 may be power systems of the same type as those in this embodiment, or other types of power systems.

The type and size of the electrical grid 2 are not specifically limited. For example, the electrical grid 2 may be a small-scale supply network (microgrid) that includes photovoltaic generation.

Unfortunately, the power system 1 in this embodiment cannot unlimitedly control the electric energy of input and output power. As shown in FIG. 1, the power system 1 includes a power storage 12, and obtains power to be output to the electrical grid 2, from the power storage 12. For example, as shown in FIG. 1, an embodiment where the power storage 12 includes a storage battery as a power charge device, and charges power in the storage battery is conceivable. In such a case, the electric energy allowed to be charged in the power storage 12 is not infinite. Accordingly, the power system 1 can only output finite electric energy to the electrical grid 2.

The power input from the electrical grid 2 to the power system 1 is charged in the power storage 12. Consequently, the power storage 12 cannot receive power more than the capacity allowed to be charged in the power storage 12. That is, the power system 1 only can receive finite electric energy from the electrical grid 2.

Note that in the above description, the storage battery is exemplified. The power system 1 in this embodiment is applicable to a system that cannot infinitely control input and output power. Accordingly, the mechanism of charging the power in the power storage 12 is not limited to the storage battery. For example, it is conceivable that power may be converted into hydrogen, or rotational energy of a rotator, such as a flywheel, and then stored.

As described above, the power system 1 in this embodiment is a system that has a limitation on the electric energy of input and output power. For example, currently, power systems including a virtual synchronous inverter, a storage battery inverter and the like attracting attention in terms of supplying the adjustment capability correspond to this embodiment.

Because of such a limitation, an instruction about input and output power from the electrical grid 2 cannot be followed in some cases. For example, at timing when power should be output to the electrical grid 2, possible trial of output in a state where little power is charged in the power storage 12 (for example, "SoC" of the storage battery internally included in the power storage is "0%") leads to a failure of the storage battery.

Accordingly, the power system 1 in this embodiment prevents the failure by autonomously adjusting the energy of input and output power. For example, even if the energy of input and output power is designated from the electrical grid 2, the power system 1 does not necessarily output designated energy, and can sometimes increase or reduce the designated energy. Even if output to the electrical grid 2 is designated, input from the electrical grid 2 can sometimes be made. In contrast, even if input from the electrical grid 2 is designated, output to the electrical grid 2 can sometimes be made.

Furthermore, in general, for the sake of stabilizing the electrical grid 2, the power system 1 is required to consider the frequency of the electrical grid 2, which is called the grid frequency. For the electrical grid 2, a reference frequency, such as of 50 Hz, for example, is predefined. The grid frequency is required to be matched with the reference frequency as much as possible.

The input and output power and the grid frequency have a relationship called drooping characteristics. For example, a force of increasing the grid frequency is applied to the power output to the electrical grid 2, and a force of reducing the grid frequency is applied to the power input from the electrical grid 2. Accordingly, in a case where the grid frequency is higher than the reference frequency, control is performed so that the output rate can be reduced when power is output to the electrical grid 2, and the input rate can be increased when power is input from the electrical grid 2; such control is preferable in view of matching the grid frequency with the reference frequency as much as possible. On the other hand, in a case where the grid frequency is lower than the reference frequency, control inverted from the above case where the grid frequency is higher than the reference frequency is preferable.

Note that the drooping characteristics are represented by the speed regulation (droop speed control). The speed regulation is a constant that indicates the ratio of variation in input and output power to variation in grid frequency of the electrical grid 2.

The power system 1 in this embodiment adjusts the drooping characteristics according to the power charge state of the power storage 12, thereby adjusting the input and output power according to the power charge state.

Figure 2:
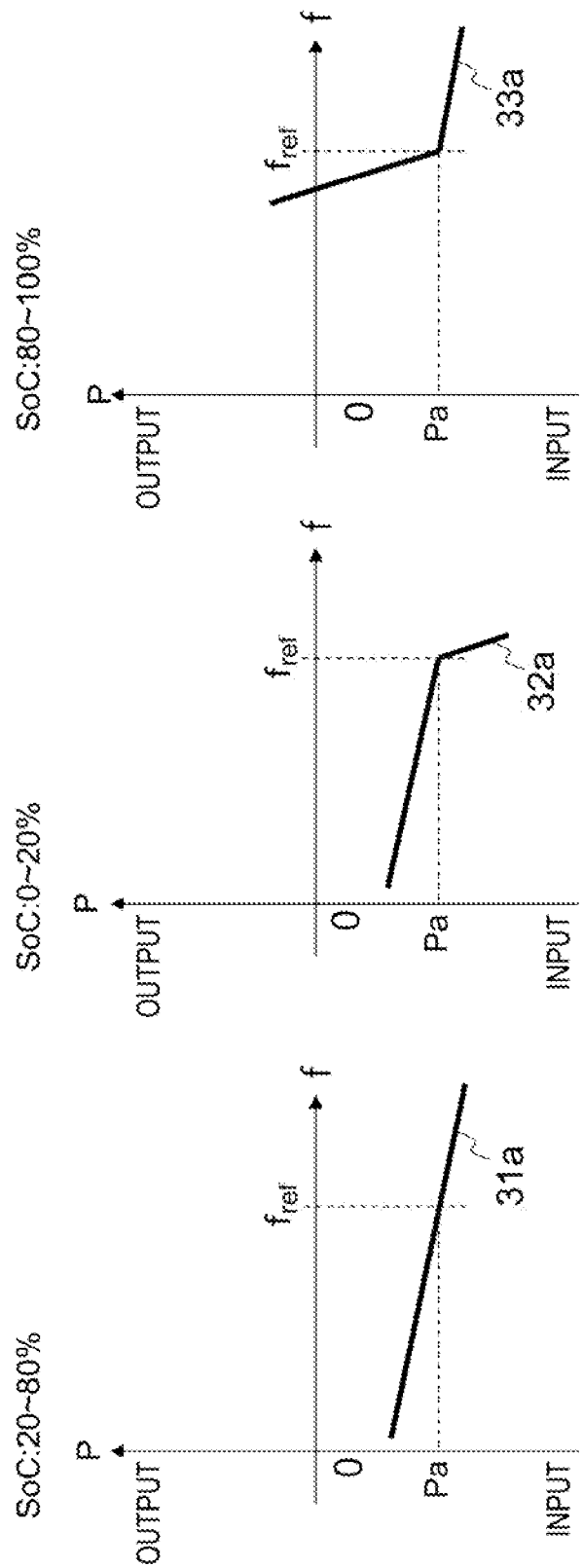
FIG. 2 shows a first example of adjusting drooping characteristics.

FIG. 2 shows a first example of adjusting the drooping characteristics. Functions (graphs) 31a to 33a shown in FIG. 2 each indicate the drooping characteristics, that is, the relationship between the grid frequency and the input and output power. Note that the example in FIG. 2 shows that the input and output power is "$P_a$" when the grid frequency is the reference frequency "$f_{res}$". "$P_a$" is assumed as, for example, active power designated by the electrical grid 2 to be output when the grid frequency is the reference frequency, but may be appropriately defined instead. Note that in the example in FIG. 2, "$P_a$" is smaller than zero. This indicates that power having an absolute value "$|P_a|$" is input from the electrical grid 2 to the power system 1. The speed regulation is represented as the slope of the function.

In the example in FIG. 2, the power charge state of the power storage is represented as "SoC" of the internally included storage battery. The range from "0%" to "100%" of "SoC" is classified into three. Three functions are shown that are the function 31a with "SoC" in the range from "20%" to "80%", the function 32a with "SoC" in the range from "0%" to "20%", and the function 33a with "SoC" in the range from "80%" to "100%".

Note that the range of "SoC" corresponding to the function may be appropriately defined. That is, the example in FIG. 2 shows the three functions that are the function 31a with "SoC" in the range from "20%" to "80%", the function 32a with "SoC" in the range from "0%" to "20%", and the function 33a with "SoC" in the range from "80%" to "100%". Alternatively, the ranges of "SoC" assigned to the respective functions may be appropriately defined, and the number of functions may also be appropriately defined.

The function 31a indicates that the value of output power linearly varies with respect to frequency variation. On the other hand, the slope of the function 32a is changed at the plotted point of the reference frequency "$f_{res}$". Accordingly, when the grid frequency is in the range equal to or lower than the reference frequency "$f_{res}$", the function 32a is the same as the function 31a. However, when the grid frequency is in the range equal to or higher than the reference frequency "$f_{res}$", the function 32a is different from the function 31a. The function 32a has a more strongly negative slope. This indicates that since it is preferable to allow the storage battery to be charged more when "SoC" is in the range from 0 to 20%, the speed regulation is changed so that more power is received from the electrical grid 2 when "SoC" is in the range from 0 to 20%. As described above, when the grid frequency is higher than the reference frequency, it is preferable that the electric energy input from the electrical grid 2 be high. Accordingly, there is no problem if the slope is strongly negative as with the function 32a in the range where the grid frequency is equal to or higher than the reference frequency "$f_{res}$".

The slope of the function 33a is changed at the plotted point of the reference frequency "$f_{res}$". When the grid frequency is in the range equal to or higher than the reference frequency "$f_{res}$", the function 33a is the same as the function 31a. However, when the grid frequency is in the range equal to or lower than the reference frequency "$f_{res}$", the function 33a has a more strongly negative slope. In a partial range with a low grid frequency, the input and output power is positive. Such a function is adopted because the storage battery is not charged well when "SoC" is in the range from "80%" to "100%", and the smaller than the reference frequency the grid frequency is, the more preferable discharge is made also in view of the grid frequency.

Note that the functions 32a and 33a include a first sub function that adopts the plotted point where the slope changes (also called an inflection point) as the upper limit value of the grid frequency, and a second sub function that adopts the value at this plotted point as the lower limit value of the grid frequency. It can also be said that the ratio of the output rate to the grid frequency is different between the first sub function and the second sub function.

As described above, when "SoC" is low, the value of input and output power is caused to be negative (the direction where power is input to the power system 1) as much as possible, and when "SoC" is high, the value of input and output power is caused to be positive (the direction where power is output from the power system 1) as much as possible. For example, it may be predetermined how to change the function according to "SoC", and the power system 1 may change the function to be used in conformity therewith. Alternatively, as shown in FIG. 2, multiple functions where corresponding "SoC" values are predefined may be stored in the control apparatus 13, and the control apparatus 13 may select the function to be used from among the functions according to the current value of "SoC" of the power storage 12, and replace the function registered as the function to be used with the selected function.

Note that if the power system 1 is not moved in the direction of reducing the difference between the grid frequency and the reference frequency, the power system 1 cannot contribute to grid stabilization. However, another power system grid-interconnected through the electrical grid 2 may be requested to reduce the difference.

Figure 3:
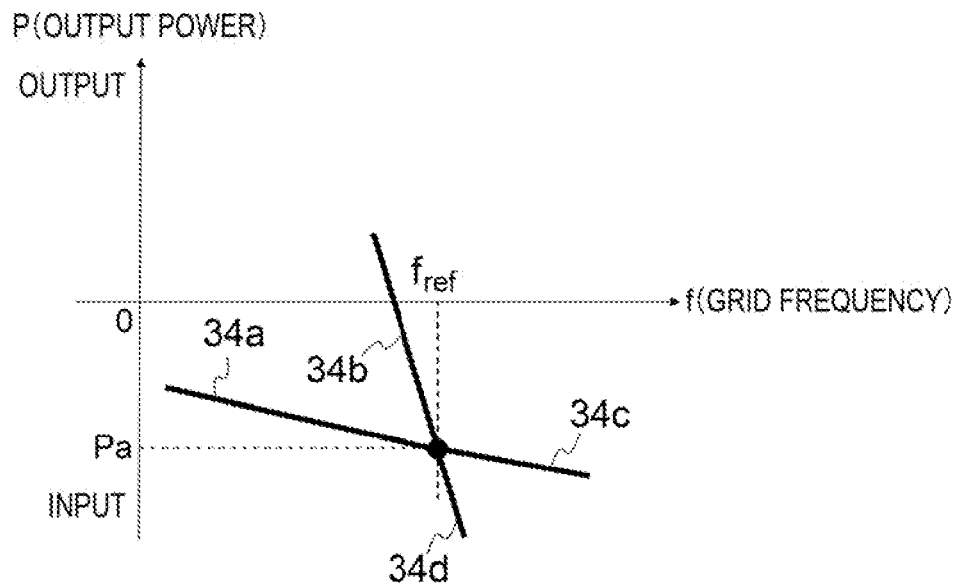
FIG. 3 shows an example of collectively showing functions in FIG. 2.

Note that in the example in FIG. 2, the functions are classified on "SoC"-by-"SoC" basis. Alternatively, the functions may be represented in an integrated manner. FIG. 3 shows an example of collectively showing the functions in FIG. 2. Data representing the usable functions in such an integrated manner may be stored in the control apparatus 13.

In the example in FIG. 3, from the plotted point at the grid frequency $f_{res}$, four functions 34a and 34d are drawn. The function 34a indicates a function used when "SoC" is in the range from 0% to 80% and the grid frequency is equal to or lower than the reference frequency "$f_{res}$". The function 34b indicates a function used when "SoC" is in the range from 80% to 100% and the grid frequency is equal to or lower than the reference frequency "$f_{res}$". The function 34c indicates a function used when "SoC" is in the range from 20% to 100% and the grid frequency is equal to or higher than the reference frequency "$f_{res}$". The function 34d indicates a function used when "SoC" is in the range from 0% to 20% and the grid frequency is equal to or higher than the reference frequency "$f_{res}$". In the example in FIG. 2, when the grid frequency is equal to or lower than the reference frequency "$f_{res}$", the function 32a with "SoC" in the range from 0% to 20% coincides with the function 31a with "SoC" in the range from 20% to 80%. Accordingly, these functions are represented as the single function corresponding to that with "SoC" in the range from 0% to 80%, as with the function 34a. When the grid frequency is equal to or higher than the reference frequency "$f_{res}$", the function 31a with "SoC" in the range from 20% to 80% coincides with the function 33a with "SoC" in the range from 80% to 100%. Accordingly, these functions are represented as the single function corresponding to that with "SoC" in the range from 20% to 100%, as with the function 34c.

The plotting of changing the speed regulation may be appropriately defined. For example, in the example in FIG. 2, the plotted point where the slopes of the functions 32a and 33a change is adopted as the reference frequency, but may be a predetermined frequency instead of the reference frequency.

In the example in FIG. 2, part of the function 31a matches part of the function 32a, and another part of the function 32a matches part of the function 33a. Such matching parts are not necessarily present. For example, it may be configured so that at the grid frequency equal to or lower than the reference frequency "$f_{res}$", the slope of the function 32a is made closer to zero than the slope of the function 31a, thereby facilitating charging at the grid frequency equal to or lower than the reference frequency "$f_{res}$", in the case of "SoC" in the range from 0% to 20% than the case of "SoC" in the range from 20% to 80%. Likewise, for example, it may be configured so that at the grid frequency equal to or higher than the reference frequency "$f_{res}$", the slope of the function 33a is made closer to zero than the slope of the function 31a, thereby reducing the charging performance at the grid frequency equal to or higher than the reference frequency "$f_{res}$" in the case of "SoC" in the range from 80% to 100% than the case of "SoC" in the range from 20% to 80%.

Figure 4:
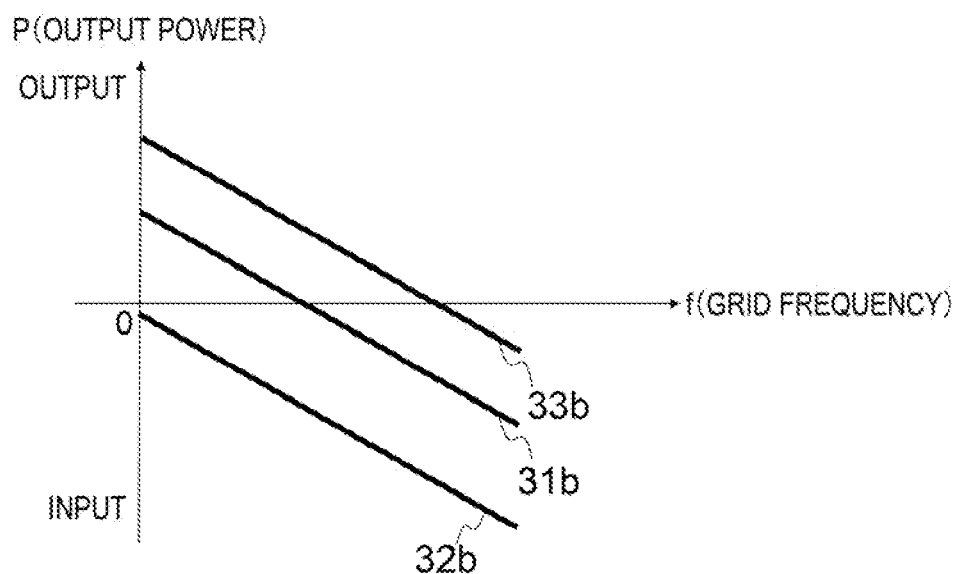
FIG. 4 shows a second example of adjusting drooping characteristics.

FIG. 4 shows a second example of adjusting the drooping characteristics. FIG. 4 shows a function 31b used when "SoC" is in a range from 21% to 79%, a function 32b used when "SoC" is in a range from 0% to 20%, and a function 33b used when "SoC" is in a range from 80% to 100%. These functions 31b to 33b are indicated as linear functions having the same slope and different intercepts. In the example in FIG. 2, at a certain plotted point, the slope of the function is changed according to "SoC". In the example in FIG. 4, the slope is not changed but the intercept is changed according to "SoC".

As shown in FIG. 4, even with drooping characteristic adjustment that translates the function can achieve the configuration so that the lower "SoC" is, the more the charging is facilitated, and the higher "SoC" is, the less the charging is facilitated.

Preferably, around the reference frequency, the output power is stabilized. Accordingly, it is preferable that the function output a constant value around the reference frequency irrespective of the grid frequency.

Figure 5:
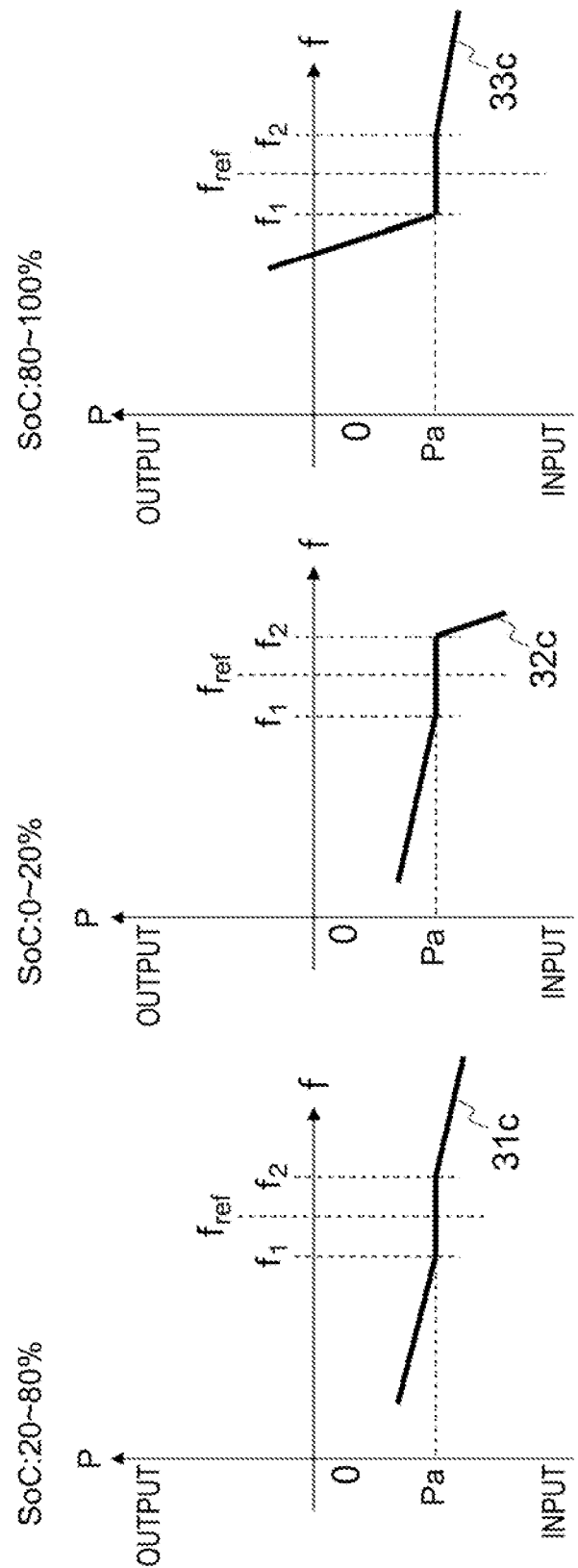
FIG. 5 shows a third example of adjusting drooping characteristics.

FIG. 5 shows a third example of adjusting the drooping characteristics. In FIG. 5, three functions are shown that are a function 31c with "SoC" in the range from "20%" to "80%", a function 32c with "SoC" in the range from "0%" to "20%", and a function 33c with "SoC" in the range from "80%" to "100%". Unlike the example in FIG. 2, a plotted point at which the slope of the function changes is present before and after the reference frequency. Between these plotted points, the slope of the function is zero. Through use of such a function, stabilization of the output power may be facilitated.

Note that in the example in FIG. 5, the slope of the function is caused to be zero around the reference frequency to facilitate stabilization. Alternatively, stabilization may be made around a predetermined frequency that is not the reference frequency. The slope of the function is not necessarily caused to be strictly zero. The slope is only required to approach zero to an allowable extent. In other words, the slope is only required to have a value that can be regarded as about zero. Multiple intervals where the output power is constant may be provided.

The function as in FIG. 5 includes, as a component, a third sub function that can receive frequencies between an upper limit value allowed to be input into the first sub function and a lower limit value allowed to be input into the second sub function. The output rate of the third sub function is constant irrespective of the value of the grid frequency.

Figure 6:
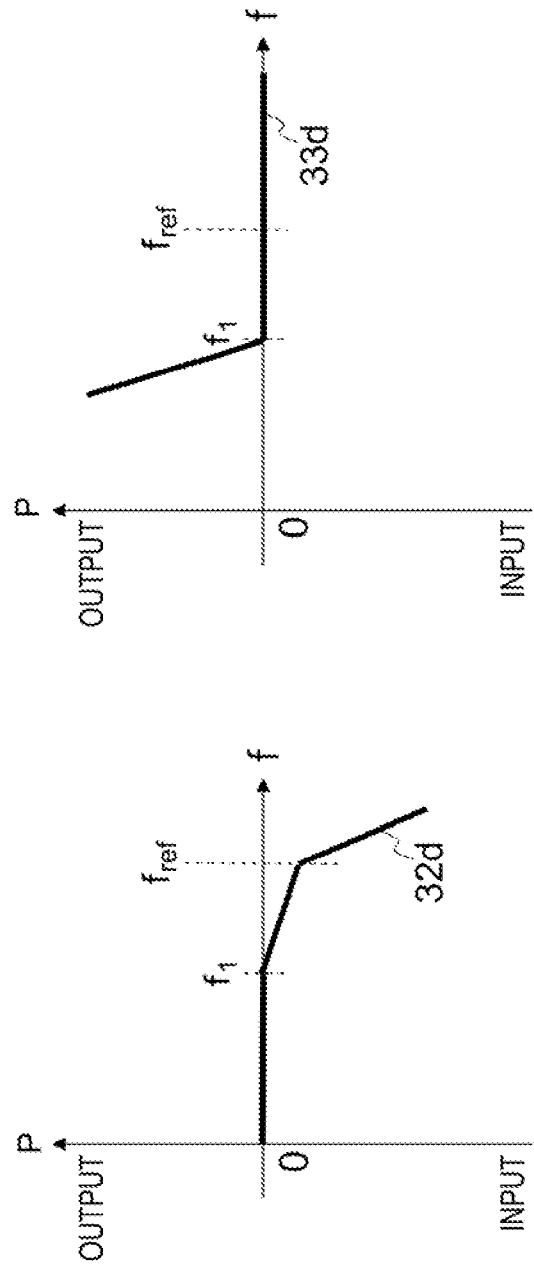
FIG. 6 shows a fourth example of adjusting drooping characteristics.

It may be configured so that discharging is not made when the storage battery is charged little, and charging is not made when the storage battery is substantially fully charged. FIG. 6 shows a fourth example of adjusting the drooping characteristics. A function 32d shown in FIG. 6 is a function when "SoC" is close to 0%. The function 32d has output power of zero when the grid frequency is f1. However, at the grid frequency equal to or lower than f1, the value of the output power is not positive but is left zero. Through use of such a function, control such that discharging is not performed when "SoC" is low may be performed.

A function 33d shown in FIG. 6 is a function when "SoC" is close to 100%. The function 33d has output power of zero when the grid frequency is f1. However, at the grid frequency equal to or higher than f1, the value of the output power is not negative but is left zero. Through use of such a function, control such that charging is not performed when "SoC" is high may be performed.

Note that in the example in FIG. 6, the output power is maintained to be zero, but may be maintained to be a predetermined value other than zero. Instead of maintaining the predetermined value, the slope of the function may be caused to approach zero as the power approaches the predetermined value, and the power may be caused to gradually approach the predetermined value. Alternatively, every time the grid frequency reaches any of predetermined values, the slope may be changed in a stepwise manner.

Figure 7:
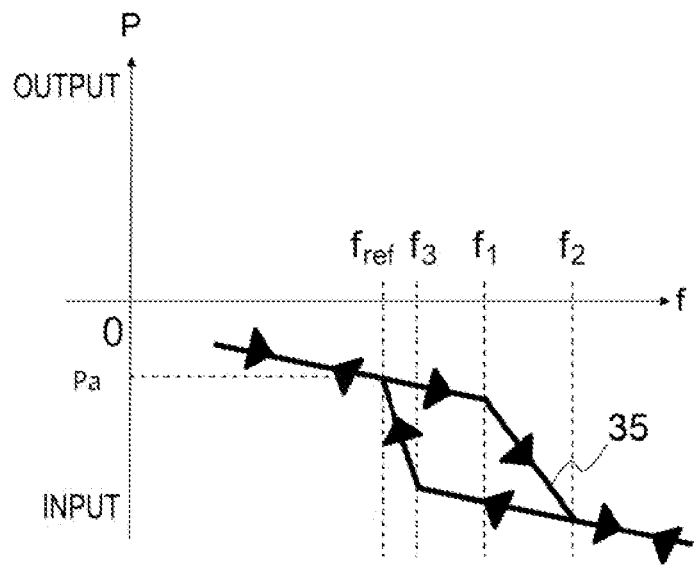
FIG. 7 shows a fifth example of adjusting drooping characteristics.

The functions shown in the examples in the diagrams described above have the same value in both the cases where the grid frequency increases and decreases. Alternatively, the functions may have hysteresis characteristics that indicate different values in the cases where the grid frequency increases and decreases. FIG. 7 shows a fifth example of adjusting the drooping characteristics. A function 35 shown in FIG. 7 has hysteresis characteristics. The function 35 is assigned marks like tips of arrows so as to show the variation directions of output power according to the variation direction of the grid frequency. For example, such hysteresis characteristics may be used in a case where the load on the power system 1 is different between increase and decrease in grid frequency, and a case where limitation is imposed when the grid frequency goes away from the reference frequency.

In the above examples, the function is caused to support the range of "SoC", as with the function 31a corresponding to that with "SoC" in the range from 20% to 80%. Consequently, for example, in both the cases of "SoC" of 40% and 60%, the same function is used. Accordingly, the values of input and output power are the same as each other. Alternatively, the function may change the function according to the value of "SoC". That is, "SoC" may be dealt with as one variable of the function.

Figure 8:
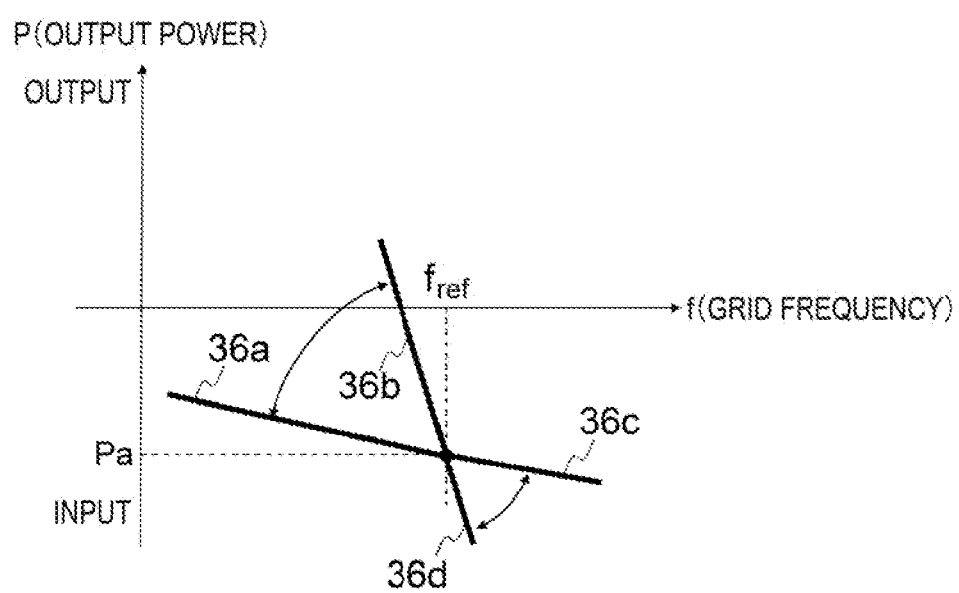
FIG. 8 shows a sixth example of adjusting drooping characteristics.

FIG. 8 shows a sixth example of adjusting the drooping characteristics. In the example in FIG. 8, "SoC" is used as a variable of the function. FIG. 8 shows functions 36a to 36d. The function 36a indicates a function used when "SoC" is in the range from 0% to 40% and the grid frequency is equal to or lower than the reference frequency "$f_{res}$". The function 36b indicates a function used when "SoC" is in the range from 80% to 100% and the grid frequency is equal to or lower than the reference frequency "$f_{res}$". The function 36c indicates a function used when "SoC" is in the range from 60% to 100% and the grid frequency is equal to or higher than the reference frequency "$f_{res}$". The function 36d indicates a function used when "SoC" is in the range from 0% to 20% and the grid frequency is equal to or higher than the reference frequency "$f_{res}$".

In the example in FIG. 8, no function used when "SoC" is in the range from 40% to 80% and the grid frequency is equal to or lower than the reference frequency "$f_{res}$" is shown. In this case, a corresponding function is determined by causing the slope of the function 36a to deviate in a direction toward the function 36b according to the amount of increase in "SoC" from 40%. Likewise, no function used when "SoC" is in the range from 20% to 60% and the grid frequency is equal to or higher than the reference frequency "$f_{res}$" is shown. In this case, a corresponding function is determined by causing the slope of the function 36d to deviate in a direction toward the function 36c according to the amount of increase in "SoC" from 20%. As described above, by changing the function according to the fine and strict value of "SoC", the value of output power can support the fine and strict value of "SoC".

Note that the examples of the functions described above may be combined. For example, a function that has both the interval where the output is constant, and hysteresis characteristics. The example of the function to be used may be different according to "SoC"; for example, when "SoC" is in the range from 0% to 20%, the function 32b is used, and when "SoC" is in the range from 80% to 100%, the function 33c is used.

Figure 9:
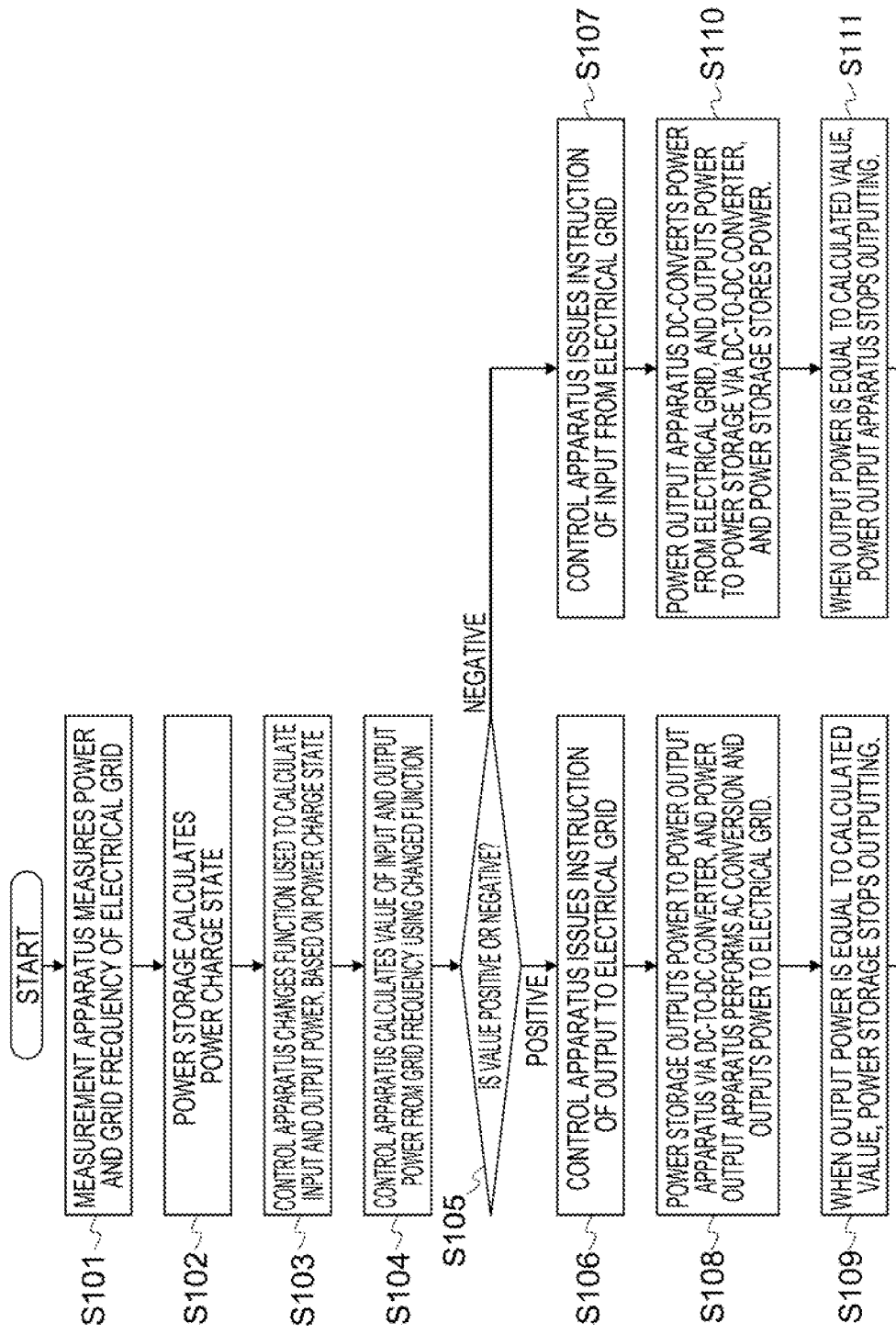
FIG. 9 is a schematic flowchart of processes of adjusting input and output power to and from the power system of this embodiment.

Next, the processes of components of the power system 1 are described with the flow thereof. FIG. 9 is a schematic flowchart of processes of adjusting input and output power to and from the power system 1 of this embodiment. Note that the flowchart of this description is an example, and may be appropriately adjusted. For example, only if the result of the processes is not affected, the order of the processes may be changed, and processes may be performed in parallel. For example, the processes of S101 and S102 may be replaced with each other, or performed in parallel with each other.

The measurement apparatus 11 measures the power and the grid frequency of the electrical grid 2 (S101). Note that the measurement apparatus 11 may include one or more sensors. The power and the grid frequency of the electrical grid 2 may be measured by the respective sensors different from each other. In the example in FIG. 1, the sensor of measuring voltage, and the sensor of measuring current are shown. For example, the grid frequency may be calculated from the measured voltage. In a case of calculating the active power, the active power can be calculated using the measured current and voltage. Note that information, such as on the grid frequency, required for processes in the control apparatus 13 may be calculated by the measurement apparatus 11, and be transmitted to the control apparatus 13. Alternatively, information, such as on the current and the voltage, allowing calculation to obtain information required for processes in the control apparatus 13 may be transmitted by the measurement apparatus 11 to the control apparatus 13, and the control apparatus 13 may generate the required information using the information allowing the calculation.

The power storage 12 calculates the power charge state (S102). In the example in FIG. 1, the storage battery as the power charge device, and the BMU that controls the storage battery are shown. The BMU records the number of charge and discharge cycles of the storage battery, and estimates the current "SoC" of the storage battery in actuality. There is also the charging curve analysis that is a method of estimating "SoC" from the current and voltage when the storage battery is charged and discharged. Through use of such a publicly known method, the value of a parameter, such as "SoC", corresponding to the power charge state may be estimated. Information, such as on the power charge state, required for processes in the control apparatus 13 may be calculated by the power storage 12, and be transmitted to the control apparatus 13. Alternatively, information, such as on the current and the voltage, allowing calculation to obtain information required for processes in the control apparatus 13 may be transmitted by the power storage 12 to the control apparatus 13, and the control apparatus 13 may generate the required information using the information allowing the calculation.

The control apparatus 13 obtains the power charge state from the control apparatus 13, and changes the function to be used to calculate input and output power on the basis of the power charge state (S103). As described above, the function to be used may be changed based on a parameter indicating the degree of change according to "SoC", or on selection of a function supporting "SoC" from among preliminarily provided functions. For example, in the example in FIG. 2, when "SoC" is determined as 40%, the control apparatus 13 may select the function 31a including the range supporting 40% from among the three functions 31a to 33a shown in FIG. 2, and replace the function to be used with the function 31a.

The control apparatus 13 then obtains the grid frequency from the sensor, and calculates the value of input and output power from the grid frequency using the changed function. In other words, the output destination and the output rate of power of the power output apparatus are determined.

Note that when a predetermined condition is satisfied, the control apparatus 13 may start the processes of S103 and S104. For example, the control apparatus 13 may receive, from the electrical grid 2, a notification of allowing control of input and output power, i.e., determination of the output destination and the output rate of power of the power output apparatus, and perform the processes of S103 and S104 upon receipt of the notification, the receipt serving as a trigger. If the notification is not received, the output destination and the output rate of power of the power output apparatus may be determined in conformity with the instruction by the electrical grid 2.

If the value of input and output power is positive (POSITIVE in S105), the control apparatus 13 issues an instruction of output to the electrical grid (S106). In contrast, if the value of input and output power is negative (NEGATIVE in S105), the control apparatus 13 issues an instruction of input from the electrical grid (S107).

If the instruction indicates output, the power storage 12 outputs power to the power output apparatus 14 via the DC-to-DC converter 15, and the power output apparatus 14 AC-converts the power and outputs the power to the electrical grid 2 (S108). When the power output to the power output apparatus 14 is equal to the calculated value, the power storage 12 stops outputting (S109). Accordingly, not in conformity with the instruction from the electrical grid 2, the autonomously calculated electric energy is output, and the flow is finished.

On the other hand, if an instruction for charging is issued, the power output apparatus 14 AD-converts the power from the electrical grid 2, and outputs the power from the electrical grid 2, to the power storage 12 via the DC-to-DC converter 15, and the power storage 12 stores the power (S110). When the power output to the power storage 12 is equal to the calculated value, the power output apparatus 14 stops outputting (S111). Accordingly, not in conformity with the instruction from the electrical grid 2, the autonomously calculated electric energy is input, and the flow is finished.

As described above, according to the instruction from the control apparatus 13, based on input power from one of the electrical grid 2 and the power storage 12, the power output apparatus 14 generates power to be output to the other of the electrical grid 2 and the power storage 12, and outputs electric energy in conformity with the instruction of the control apparatus 13.

As described above, the power system 1 in this embodiment adjusts the drooping characteristics according to the power charge state of the power storage 12, which limits the input and output power, thereby autonomously adjusting the input and output power. According to such adjustment, even when an instruction against the power charge state is obtained from the electrical grid 2, the situations can be flexibly addressed, which can prevent failures of devices included in the power system 1.

This adjustment allows a strategic operation where the power system 1 intentionally outputs no power when another power system 1 outputs power in a power adjustment market.

Note that the control apparatus 13 may be achieved by a dedicated electronic circuit (i.e., hardware), such as an IC (integrated circuit) mounted with a processor and a memory. At least part of the embodiment described above may be achieved by executing software (program). For example, a general-purpose computer apparatus may be used as basic hardware, and a processor, such as a CPU, mounted on the computer apparatus may be caused to execute a program, which can achieve the processes in the embodiment described above.

For example, a computer reads dedicated software stored in a computer-readable storage medium, thereby allowing the computer to serve as the apparatus in the embodiment described above. The type of the storage medium is not specifically limited. The dedicated software downloaded via a communication network may be installed in a computer, thereby allowing the computer to serve as the apparatus in the embodiment described above. As described above, information processing through software is specifically implemented using hardware resources.

FIG. 10 is a block diagram showing an example of a hardware configuration according to one embodiment of the present invention. The control apparatus 13 includes a processor 41, a main storage device 42, an auxiliary storage device 43, a network interface 44, and a device interface 45, which are connected to each other via a bus 46, thereby allowing the apparatus to be implemented as a computer apparatus 4.

Note that the computer apparatus 4 in FIG. 10 includes a single component corresponding to each component. Alternatively, this apparatus may include a plurality of the same components corresponding to each component. FIG. 10 shows the single computer apparatus 4. Alternatively, software may be installed in a plurality of computer apparatuses, and the computer apparatuses may respectively perform different parts of the software.

The processor 41 performs computation processes on the basis of data and programs input from internal components of the computer apparatus 4, and outputs computation results and control signals to corresponding devices and the like. Specifically, the processor 41 executes an OS (operating system) and applications of the computer apparatus 4, and controls each of the devices constituting the computer apparatus 4. The processor 41 is not specifically limited only if the processor 41 can perform the processes described above. Main processes of the control apparatus 13, such as determination of the output destination and the output rate of power of the power output apparatus 14, are performed by the processor 41.

The main storage device 42 is a storage device that stores instructions and various data items to be executed by the processor 41. The information stored in the main storage device 42 is directly read by the processor 41. The auxiliary storage device 43 is a storage device other than the main storage device 42. At least any of the main storage device 42 and the auxiliary storage device 43 may be regarded as a storage 47. In a case where a parameter for indicating how to change the drooping characteristics, and functions indicating the drooping characteristics are preliminarily prepared, the functions can be stored in the storage 47. Note that such storage devices each mean any electronic component that can store electronic information, and may be a memory or a storage. The memory encompasses a volatile memory and a non-volatile memory, any of which may be adopted.

The network interface 44 and the device interface 45 may be components for communication with apparatuses other than the computer apparatus 4. At least any of the network interface 44 and the device interface 45 may be regarded as a communicator 48. Communication with the external apparatuses, such as the power storage 12, the power output apparatus 14, and the measurement apparatus 11, may be performed by the communicator 48.

The network interface 44 is an interface for connection to a communication network 5 wirelessly or wiredly. The network interface 44 may be what complies with an existing communication standard. Through the network interface 44, information may be exchanged with an external apparatus 5A via the communication network 5.

The device interface 45 is an interface, such as a USB, for direct connection to an external apparatus 5B. The external apparatus 5B may be an external storage medium, or a storage apparatus, such as a database.

The external apparatuses 5A and 5B may be output apparatuses. The output apparatuses may be, for example, a display apparatus for displaying an image, an apparatus that outputs audio and the like. For example, the apparatuses may be an LCD (liquid crystal display), a CRT (cathode ray tube), a PDP (plasma display panel), a speaker and the like. However, there is no limitation thereto.

Note that the external apparatuses 5A and 5B may be input apparatuses. The input apparatus may include devices, such as a keyboard, a mouse, and a touch panel, and provide the computer apparatus 4 with information input through these devices. Signals from the input apparatus are output to the processor 41.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A control apparatus controlling a power output apparatus that generates, based on input power from one of an electrical grid and a power storage, output power to another of the electrical grid and the power storage, the control apparatus comprising:
a communicator configured to receive a grid frequency of the electrical grid and a state of charge of the power storage, or information allowing the grid frequency and the state of charge to be calculated; and
a processor configured to determine an output destination and an output rate of the output power based on a predetermined function of calculating the output destination and the output rate depending on the grid frequency,
wherein
when the communicator receives instruction regarding the output destination and the output rate of the output power from the electrical grid, the processor determines the output destination and the output rate of the output power following the instruction, and
when the communicator receives a notification different from the instruction from the electrical grid or in a predetermined time slot, the processor determines the output destination and the output rate are adjusted according to the state of charge, by changing the function.

2. The control apparatus according to claim 1,
wherein in a case where a value of the grid frequency used for calculation is identical, the function used with the state of charge being higher calculates the output rate to the electrical grid to be higher than the function used with the state of charge being lower does when the electrical grid is the output destination, and calculates the output rate to the power storage to be lower than the function used with the state of charge being lower does when the power storage is the output destination.

3. The control apparatus according to claim 1,
wherein at least in a predetermined range of the grid frequency, the function performs calculation so that the higher the grid frequency is, the lower the output rate to the electrical grid is, when the electrical grid is the output destination, and performs calculation so that the higher the grid frequency is, the higher the output rate to the power storage is, when the power storage is the output destination.

4. The control apparatus according to claim 1, wherein the function includes, as components:
   a first sub function that is a linear function and adopts a first frequency value as an upper limit value allowed to be input; and
   a second sub function that is a linear function and adopts the first frequency value, or a second frequency value different from the first frequency value, as a lower limit value allowed to be input, and
   the first sub function and the second sub function have different ratios of the output rate to the grid frequency.

5. The control apparatus according to claim 4, wherein the second sub function adopts the second frequency value as a lower limit value allowed to be input,
   the function further includes, as a component, a third sub function that adopts the first frequency value as a lower limit value allowed to be input and adopts the second frequency value as an upper limit value allowed to be input, and
   the third sub function causes the output rate to be a constant value irrespective of a value of the grid frequency.

6. The control apparatus according to claim 1, wherein the processor causes the function to change output, when the corresponding state of charge is lower than a predetermined value and the electrical grid is the output destination, so that the output rate to the electrical grid is a predetermined lower limit value.

7. The control apparatus according to claim 1, wherein the processor causes the function to change output, when the corresponding state of charge is higher than a predetermined value and the power storage is the output destination, so that the output rate to the power storage is a predetermined lower limit value.

8. The control apparatus according to claim 1, wherein the processor changes the function to change the output rateswhen the grid frequency increases and decreases for a predetermined frequency range.

9. The control apparatus according to claim 2, wherein the function is a linear function, and
   before and after the function is changed, the function has an identical ratio of the output rate to the grid frequency.

10. The control apparatus according to claim 1, wherein the processor selects a function that corresponds to the state of charge from among a plurality of predetermined functions.

11. A power system, comprising:
    a power output apparatus configured to generate, based on input power from one of an electrical grid and a power storage, output power to another of the electrical grid and the power storage;
    a control apparatus configured to control the power output apparatus, wherein the control apparatus comprises:
    a communicator configured to receive a grid frequency of the electrical grid and a state of charge of the power storage, or information allowing the grid frequency and the state of charge to be calculated; and
    a processor configured to determine an output destination and an output rate of the output power, from the grid frequency, based on a predetermined function of calculating the output destination and the output rate depending on when the grid frequency,
    wherein
    when the communicator receives instruction regarding the output destination and the output rate of the output power from the electrical grid, the processor determines the output destination and the output rate of the output power following the instruction,
    when the communicator receives a notification of permitting determination of the output destination and the output rate of the output power from the electrical grid or in a predetermined time slot, the processor determines the output destination and the output rate adjusted according to the state of charge, by changing the function, and
    the power output apparatus receives the input power from one of the electrical grid and the power storage that is determined not to be the output destination, generates the output power based on the input power, and outputs the output power to the output destination determined by the control apparatus, at a rate as high as the output rate determined by the control apparatus.

12. A control method of controlling a power output apparatus that generates, based on input power from one of an electrical grid and a power storage, output power to another of the electrical grid and the power storage, the control method comprising:
    receiving a grid frequency of the electrical grid and a state of charge of the power storage, or information allowing the grid frequency and the state of charge to be calculated; and
    determining an output destination and an output rate of the output power, from the grid frequency, based on a predetermined function of calculating the output destination and the output rate depending on the grid frequency,
    wherein
    when an instruction regarding the output destination and the output rate of the output power is received from the electrical grid, determining the output destination and the output rate of the output power following the instruction, and
    when a notification of permitting determination of the output destination and the output rate of the output power is received from the electrical grid or in a predetermined time slot, the processor determines the output destination and the output rate adjusted according to the state of charge, by changing the function.

* * * * *

UNITED STATES PATENT AND TRADEMARK OFFICE
CERTIFICATE OF CORRECTION

PATENT NO. : 11,888,341 B2
APPLICATION NO. : 17/690697
DATED : January 30, 2024
INVENTOR(S) : Hiroshi Uno et al.

Page 1 of 1

It is certified that error appears in the above-identified patent and that said Letters Patent is hereby corrected as shown below:

In the Claims

Claim 1, Column 12, Lines 49-50, "the output destination and the output rate are adjusted" should read --the output destination and the output rate adjusted--.

Claim 8, Column 13, Line 41, "rateswhen" should read --rates when--.

Claim 11, Column 14, Line 9, "depending on when the grid frequency," should read --depending on the grid frequency,--.

Signed and Sealed this
Eleventh Day of June, 2024

Katherine Kelly Vidal
*Director of the United States Patent and Trademark Office*